Patented May 22, 1934

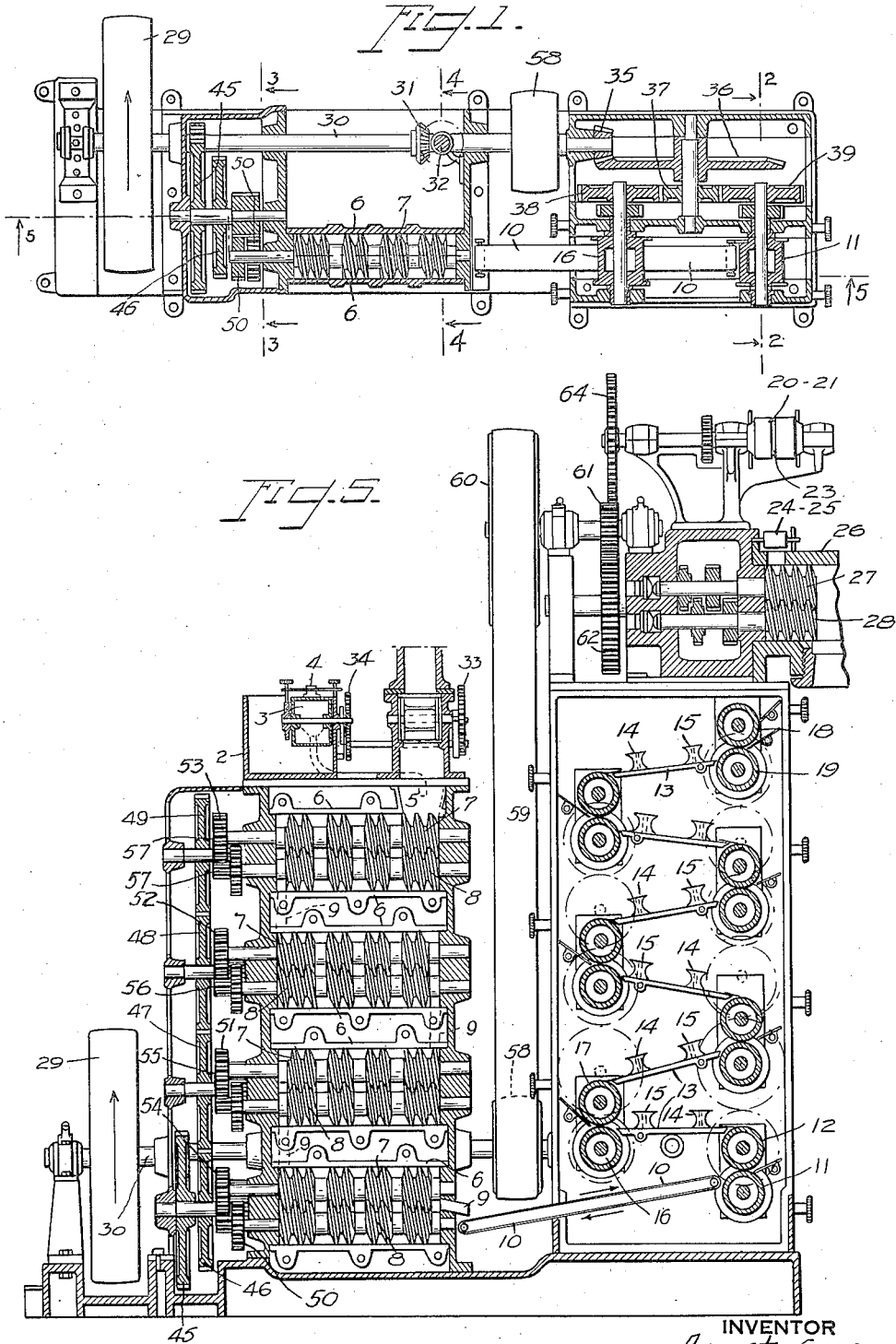

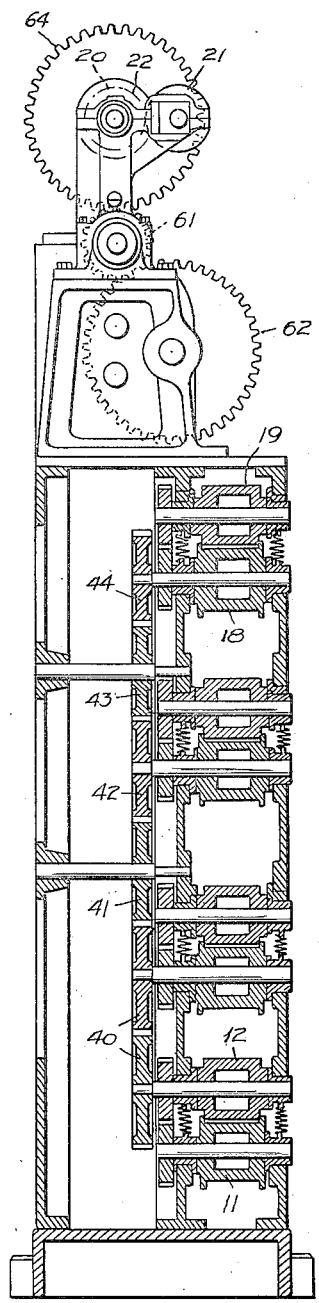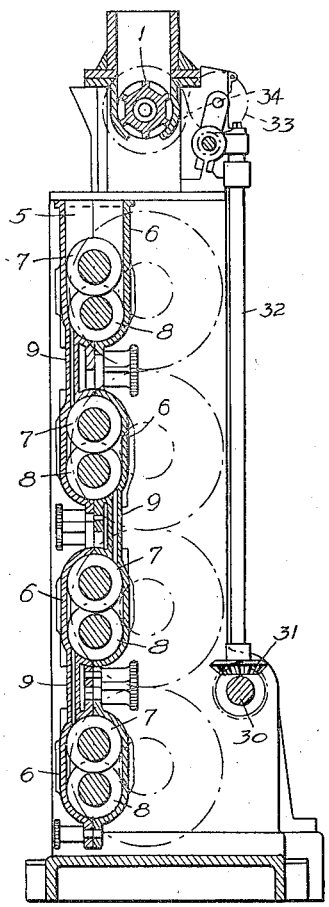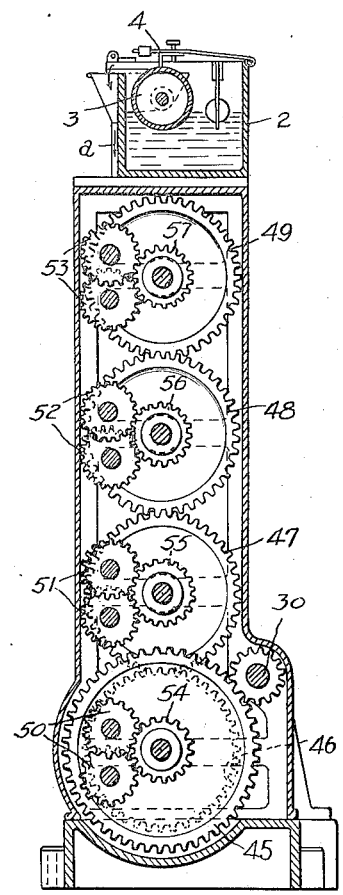

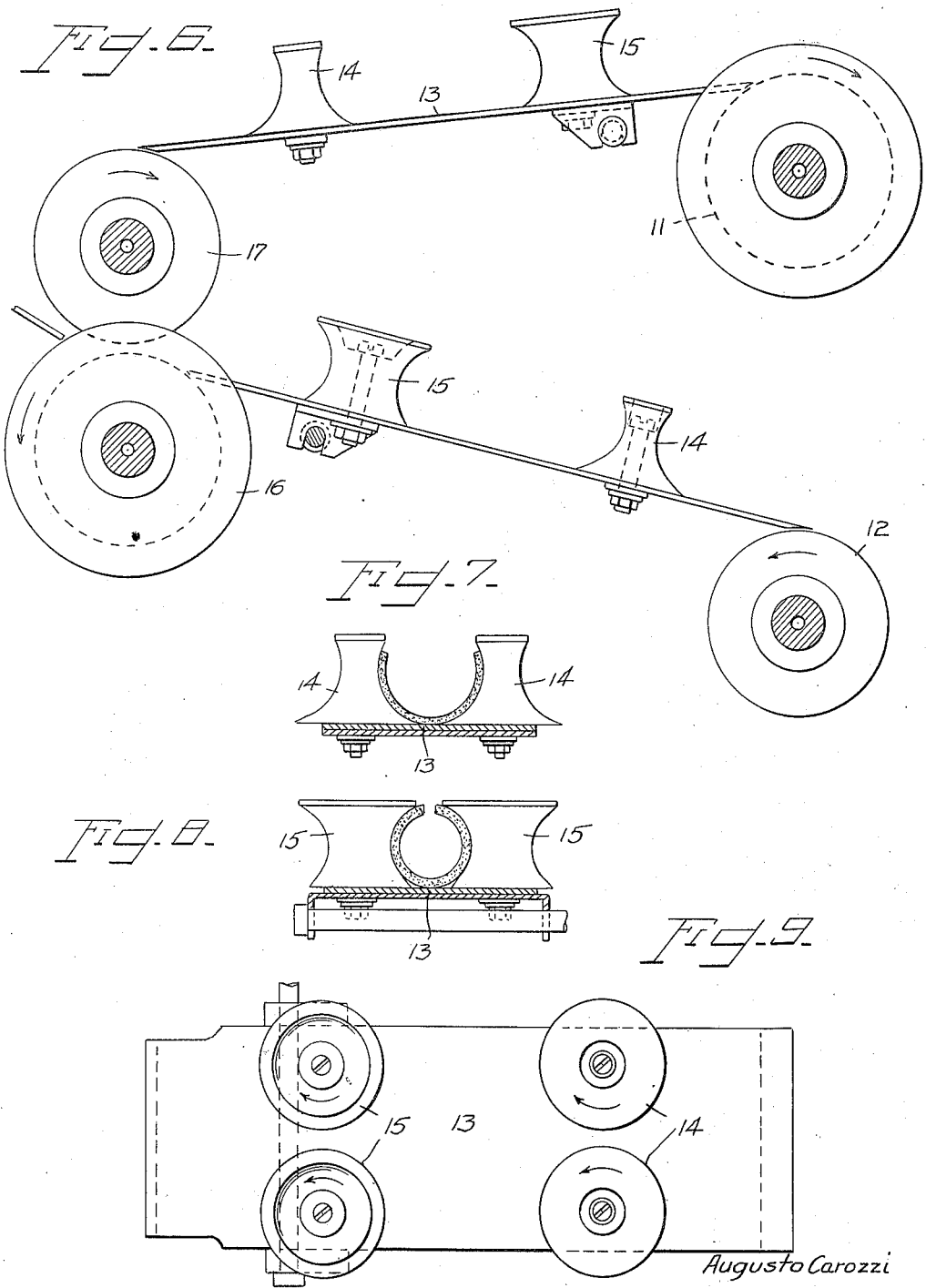

1,959,569

UNITED STATES PATENT OFFICE 1,959,569

MACHINE FOR THE AUTOMATIC CONTINUOUS PRODUCTION OF ALIMENTARY PASTE OF THE MACARONI AND VERMICELLI TYPE

Augusto Carozzi, Genoa, Italy

Application December 1, 1931, Serial No. 578,250
In Italy December 31, 1930

8 Claims. (Cl. 107—8)

It is known that up to date the alimentary pastes, such as macaroni, vermicelli etc. are produced by separate and distinct operations, namely kneading, refining and pressing by suitable machines which require much manual labor and the manipulation of which involves some danger.

The present invention has for its object to eliminate these disadvantages by means of a machine which, besides performing said operations successively and automatically, may be in continuous production and produce a greater yield while the amount of manual labor and the dangers of operation are minimized.

In order that the invention may be better understood it has been illustrated by way of example in the annexed drawings, in which:

Fig. 1 is a partially sectional plan view,

Figs. 2, 3 and 4 are sections along lines 2—2, 3—3 and 4—4, respectively of Fig. 1

Fig. 5 is a longitudinal section on line 5—5 of Fig. 1 showing the pressing devices for pushing the paste to the dies.

Fig. 6 is an elevational view on an enlarged scale, of raking knives and vertical rollers therefor;

Fig. 7 is a substantially transverse section through the knife and in the region of the first rollers;

Fig. 8 is a substantially transverse sectional view taken adjacent the second set of vertical rollers; and Fig. 9 is a plan view of the knife and rollers.

With reference to the said drawings the operation of the machine is the following:

The dosage of grist or flour is obtained by means of a dosing roller 1 placed at the top of the machine, to which the proper number of revolutions are imparted according to the product to be obtained. The water is maintained at a constant level in the tank 2 and is carried and dosed by the rotation of the cylinder 3 on the surface of which said water is controlled by an adjustable raker 4 according to the latter remaining more or less spaced from the cylinder surface at such a distance as is necessary for supplying a quantity of water calculated for the consistency of the paste.

The flow of the water is indicated by arrows $a$ and the latter is fed together with the flour which falls from the cylinder 1 in a collecting chamber 5 of the kneading machine.

The kneading machine comprises casings 6 containing each two screws 7—8 meshing together with intermediate spaces. The threads of each screw in each couple fit close into the spaces between the threads of the other, so that a tight closure between them is obtained, the rotation of the dough being thus avoided. Said screws by turning in the same direction oblige the dough to advance within the casings, which are in contact with the same screws, so that the necessary pressure is obtained to push the dough towards the exit opening 9 provided in the first casing, from which the dough reaches the underlying couples of screws, where the operation is repeated and so on till the paste, when coming out of the last opening 9, provided on the middle line between the two last screws, is pushed on a continuously rotating ribbon 10 conveying the paste into cylinders 11 and 12 where the paste is submitted to the first rolling operation. Thereupon the paste passes on the raking knife 13 and is manually accompanied between two vertical rollers 14 shaped in such a way that they give the paste a semicylindrical form; in further progressing the paste passes between two more vertical rollers 15 having such a shape that they give the paste a more closed cylindric shape.

From said vertical rollers 15 the mass of the paste is manually pushed between the cylinders 16 and 17 by which the mass is flattened again by crushing two layers of the paste one on the other, then in further progressing the paste is introduced little by little between the overlying cylinders and rollers, which are perfectly identical to the others above mentioned until the paste arrives refined between the upper cylinders 18 and 19 to be then conveyed by hand to the cylinders 20 and 21 provided above the press.

Said cylinders have the object of dividing the ribbon in two equal parts by means of a projection 22 solidary to a cylinder penetrating into a recess 23 provided in the other cylinder. The two parts of the ribbon are accompanied between the pairs of rollers 24 and 25 arranged on holes provided in the casing 26 of the press.

Said pairs of rollers push and press the paste within the spaces of the threads of screws 27 and 28 forming the pressing machine.

The press comprises two continuous helical screws 27 and 28 meshing and rotating in the same direction and placed in a casing 26, by which they are closely surrounded.

The paste which is continuously pushed between the interspaces of the threads of the said screws owing to the said threads gearing with each other, form a closure for the thorough adherence between each other and oppose the rotation of the paste and compel same to advance towards the dies.

The pulley wheel 29 by means of its shaft 30 transmits power to the pinion gears 31 operating the vertical shaft 32 which, by means of the worm drive, counter shaft and gears 33 and 34 transmit rotation to the dosing roller 1 and to the water feeding roller 4. At the same time the shaft 30 through bevel pinion 35 rotates the toothed crown 36, which, in its turn through toothed wheels 37—38—39 effects rotation of the series of cylinders 11 and 12, 16 and 17, and 18 and 19 on the axes of which are fixed the toothed wheels 40, 41, 42, 43 and 44 engaging with one another.

This movement is simultaneous with the rotation of the series of screws 7 and 8. This rotation is transmitted to said screws by a gear 45 operating the toothed wheels 46, 47, 48 and 49 each of the latter turning respectively, with gears 54, 55, 56 and 57 in engagement with wheels 50, 51, 52, 53 respectively, the gears 50 to 53 being fast on the axles of the screws.

On shaft 30 a second pulley wheel 58 is fixed transmitting the movement thereof through belt 59 to the pulley 60 by which the rotation is transmitted to screws 27 and 28 of the compressor through the gearing system 61, 62, 63 at the same time as the tooth wheel 64 transmits the same rotation to rollers 20 and 21.

Having now particularly described and ascertained the nature of my said invention and in what manner the same is to be performed, I declare that what I claim is:

1. In a machine of the class described, a housing, a plurality of shafts rotatably disposed therein, a helical collar supported by each shaft, the threads of said collars engaging each other with their edges lying closely adjacent the housing walls and means for rotating said shafts in the same direction.

2. A device as claimed in claim 1, in which the said collars are subdivided into a plurality of collar portions disposed upon each shaft with intervals between them.

3. A device as claimed in claim 1, in which the helical thread of each of said collars closely fits into the helical path of the other and completely occupies the same.

4. A device as claimed in claim 1, in which two shafts are provided and the collar on each thereof is subdivided into a plurality of collar portions spaced from one another and in which the said housing has an outlet at one of its ends substantially at the midportion between the two shafts.

5. A device for forming an alimentary paste comprising means for making up a paste from flour and water, means for kneading said paste and means for refining said paste comprising separate sets of horizontal rolls for forming said paste into a ribbon, raker knives bridging the space between said sets of rolls and means on said knives for imparting a cylindrical shape to the paste ribbon.

6. A device for forming an alimentary paste comprising means for making up a paste from flour and water, means for kneading said paste, means for refining said paste including a plurality of staggeredly arranged sets of horizontal rolls for forming said paste into a ribbon, raker knives spanning the gaps between said sets of rolls, means on said rolls for imparting a cylindrical shape to said paste ribbon and means for continuously conveying said paste from said kneading means to the first set of said horizontal rolls.

7. A device as in claim 6, wherein said sets of horizontal rolls are arranged in two vertical rows, the sets of one row being staggered with respect to the sets of the other row, and a raker knife connects the upper roll of a set in one row with a lower roll of the contiguous set in the other row.

8. A device as in claim 5, wherein the means on the raker knives for shaping the paste ribbon comprise pairs of spaced vertical concave rolls.

AUGUSTO CAROZZI.